Figure 1:
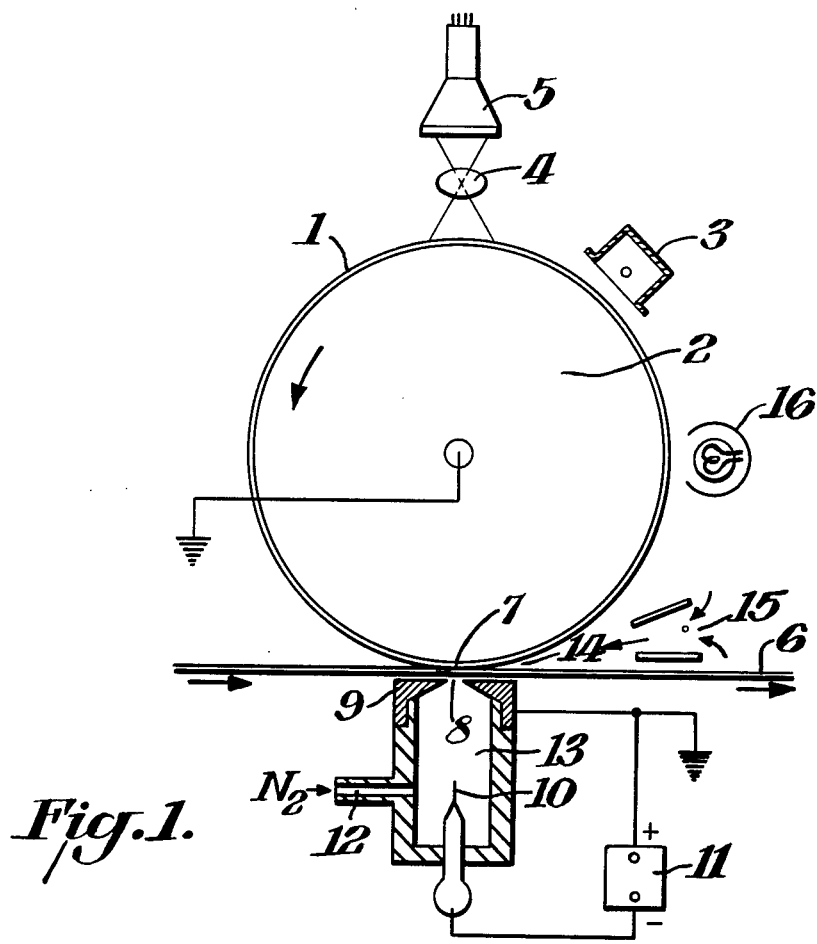

United States Patent [19]

Simm et al.

[11] 4,168,973
[45] Sep. 25, 1979

[54] PROCESS FOR THE TRANSFER PRINTING OF ELECTROSTATIC CHARGE IMAGES USING $N_2$ ATMOSPHERE

[75] Inventors: Walter Simm, Leverkusen; Friedrich Bestenreiner, Gruenwald, both of Fed. Rep. of Germany

[73] Assignee: AGFA-Gevaert, A.G., Fed. Rep. of Germany

[21] Appl. No.: 801,461

[22] Filed: May 31, 1977

[30] Foreign Application Priority Data

Jun. 5, 1976 [DE] Fed. Rep. of Germany ....... 2625393

[51] Int. Cl.[2] .......................................... G03G 13/044
[52] U.S. Cl. .................... 96/1 TE; 96/1 C; 96/1.2; 250/325; 355/3 TE; 361/225
[58] Field of Search .................. 96/1 C, 1.2, 1 TE; 250/324, 325, 326; 355/3 TE; 361/225, 229; 346/153

[56] References Cited

U.S. PATENT DOCUMENTS

| 3,023,070 | 2/1962 | Benn | 96/1 TE X |
|---|---|---|---|
| 3,057,997 | 10/1962 | Kaprelian | 96/1 TE X |
| 3,076,968 | 2/1963 | Schwertz | 96/1 TE X |
| 3,643,128 | 2/1972 | Testone | 250/326 X |
| 3,646,351 | 2/1972 | Jarvis | 361/229 X |
| 3,770,429 | 11/1973 | Kinoshita et al. | 96/1 TE |
| 3,972,716 | 8/1976 | Pressman | 96/1.2 |
| 4,021,709 | 3/1977 | Kamogawa et al. | 361/229 |

FOREIGN PATENT DOCUMENTS 145283 5/1962 U.S.S.R. ................... 96/1 TE

OTHER PUBLICATIONS

Volkers, "Xerographic Interposition Imaging Method," Xerox Discl. Bull., vol. 1, No. 6, Jun. 1976, pp. 29–30.
Schaffert, "Electrophotography," Focal Press, 1965, pp. 87–96.

Primary Examiner—Roland E. Martin, Jr.

[57] ABSTRACT

In a process for the transfer printing of charge images the carrier of a primary charge image is covered with an insulating film the backside of which is electrically charged by means of a corona discharge under concentrated gaseous nitrogen, and the film now carrying the secondary charge image is subsequently removed from the carrier of the primary charge image.

8 Claims, 4 Drawing Figures

U.S. Patent  Sep. 25, 1979  Sheet 1 of 2  4,168,973

PROCESS FOR THE TRANSFER PRINTING OF ELECTROSTATIC CHARGE IMAGES USING $N_2$ ATMOSPHERE

This invention relates to a process for the transfer of latent electrostatic charge images from one carrier to another. The transfer of charge is effected without contact between the image surfaces. To produce the colour print, partial images are transfer printed from a plurality of primary carriers to a common secondary carrier.

Charge transfer printing processes are known in which charge images are transferred from a photoconductive layer, for example a selenium layer, to a second, light insensitive insulating carrier, for example a polyester film. One simple transfer printing process, for example, consists of placing an insulated film which is metallised on one side on a selenium layer carrying a charge image which has been formed by charging and imagewise exposure of the layer. The selenium layer is applied to a conductive support, for example a metal plate. A direct voltage of 1000 to 2000 V is applied to this support and to the metallic layer of the film so that the metallic layer of the film becomes negatively charged and the metal plate under the selenium positively charged if a positive charge image is situated on the selenium surface. If the two layers are separated while the voltage is maintained, charge is transferred in a distribution controlled by the image so that a positive mirror image of the original image is formed on the film.

One particular feature of the process is the contact between that surface of the photoconductive layer which carries the charge image and the image surface of the film before separation takes place.

In another known process, this direct contact between the surfaces carrying the charge image is avoided by using a completely insulating film as acceptor of the charge image and not, as in the first example, a film which is metallised on one side. In this process, the copied charge image appears on the outer surface of the film. Here again, one may, for example, start with a selenium layer on a metal support. A charge image is produced on this layer by charging and exposure in known manner. An insulating film is then placed on the selenium layer and the free surface of the film is charged everywhere to a constant potential by means of a known device designed to produce a charging current by corona discharge. On removal of the charged film from the selenium layer, the side of the film which was charged from outside is found to carry a charge image which is a copy of the original image on the selenium and in registration with it. Depending on the sign of the charge applied, the new image may be developed into a positive or negative of the original depending on whether in the subsequent development process the areas of higher charge density are more strongly coloured than the areas of lower charge density.

Common to both the processes described above and to similar transfer printing processes is the disadvantage that in the first stage of the process, in which the insulating layer or insulating film is separated from the photoconductive layer, severe disturbances in the electric image are produced by spark discharges and charge leakages. Moreover, it is difficult to obtain electrical contact between the photoconductive layer and the film or layer placed on it without including air when covering large areas. Inclusions of air in the boundary layer are liable to cause severe charge density fluctuations which have nothing to do with the charge image and therefore have a distorting effect on the image. These interferences become very noticeable when printing half tone images, in which it is necessary to reproduce not only black and white but also numerous intermediate tones. It is then not possible to obtain transfer prints in the required quality.

According to the invention there is provided a process for the transfer printing of charge images, in which the carrier of a primary charge image is covered with an insulating film that side of film which does not make contact with the carrier is electrically charged by the charge carrying current of a corona discharge under concentrated gaseous nitrogen, and the film, carrying the secondary charge image produced in the charging process, is subsequently removed from the carrier of the primary charge image.

The invention makes it possible to prevent interferences in the transfer of charges on separation of an insulating film from the photo-conductive layer and thus to reduce the loss in quality of the image obtained in the transfer printing process so that half tone images of good quality can also be obtained by transfer printing. The invention can be used to provide a transfer printing process in which charge images can be transferred from various primary carriers to a common secondary carrier, for example for the production of colour images composed of colour separations. Embodiments of the invention can provide short transfer printing times which are advantageous for practical application.

In a preferred embodiment of the process of the invention, the carrier of the primary charge image is a rotating cylindrical body, for example a metal drum coated with selenium, over which the insulating film provided for the secondary image is moved so that the two parts make contact along a narrow contact strip on the generatrix of the cylinder and charging of the exposed side of the film is effected by a corona discharge in concentrated nitrogen.

Production of the charging current in an atmosphere of nitrogen provides the important advantage that the current produced consists of highly mobile electrons and has a high intensity which is several orders of magnitude greater than that obtained from the ionisation of air. This enables the whole charging current to be concentrated on the narrow strip of contact between the insulating film and the surface of the cylinder by interposition of a metal shield having a gap of only a few tenths of a millimeter between the corona electrode and the charging position. In atmospheric air, the charging current density would be much too low under these conditions to enable transfer printing to be achieved at speeds of, for example, 0.5 m/s. The nitrogen used according to the invention should contain less than 1% of air, but the presence of inert gases has no adverse affect.

Removal of the insulating film from the cylinderical image carrier in continuous motion causes sudden discharges even when contact is only brief. These discharges interfere with the transfer printing process and manifest themselves as Lichtenberg figures after development of the image. It has surprisingly been found that the occurrence of such figures can be prevented by directing a stream of air charged with ions to the zone of separation.

Such an ionic stream can be produced in an apparatus in which a discharge electrode in the form of wire is arranged opposite a gas permeable counter electrode, for example an electrode consisting of a metal strip which is perforated by linear slits or by rows of circular holes or an electrode in the form of a metal grid. Owing to asymmetry of the arrangement, application of a voltage produces a discharge which is directed to one side and gives rise to an ionically charged stream of air.

Due to the fact that the insulating film is moved in a straight line or approximately a straight line during transfer of the charge, it is easily possible to arrange several transfer printing stations one behind the other so that partial images carried on several primary image carriers can be transfer printed on a common secondary image carrier in the form of a band of insulating material. This possibility can be utilised for colour printing in that various colour separations of a coloured original image, for example a diapositive or a negative, can be printed over one another in correct registration in an arrangement comprising several transfer printing stations, and they can be developed in the appropriate primary colours in intermediate stations.

Figure 2:
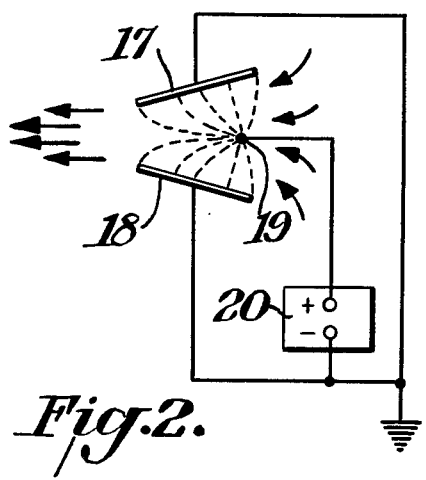
Figure 3:
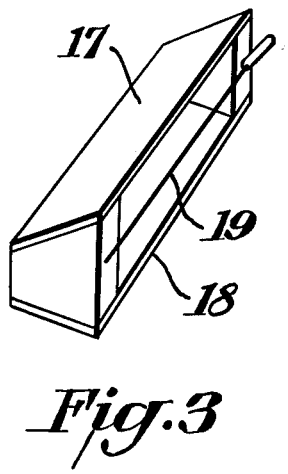
Figure 4:
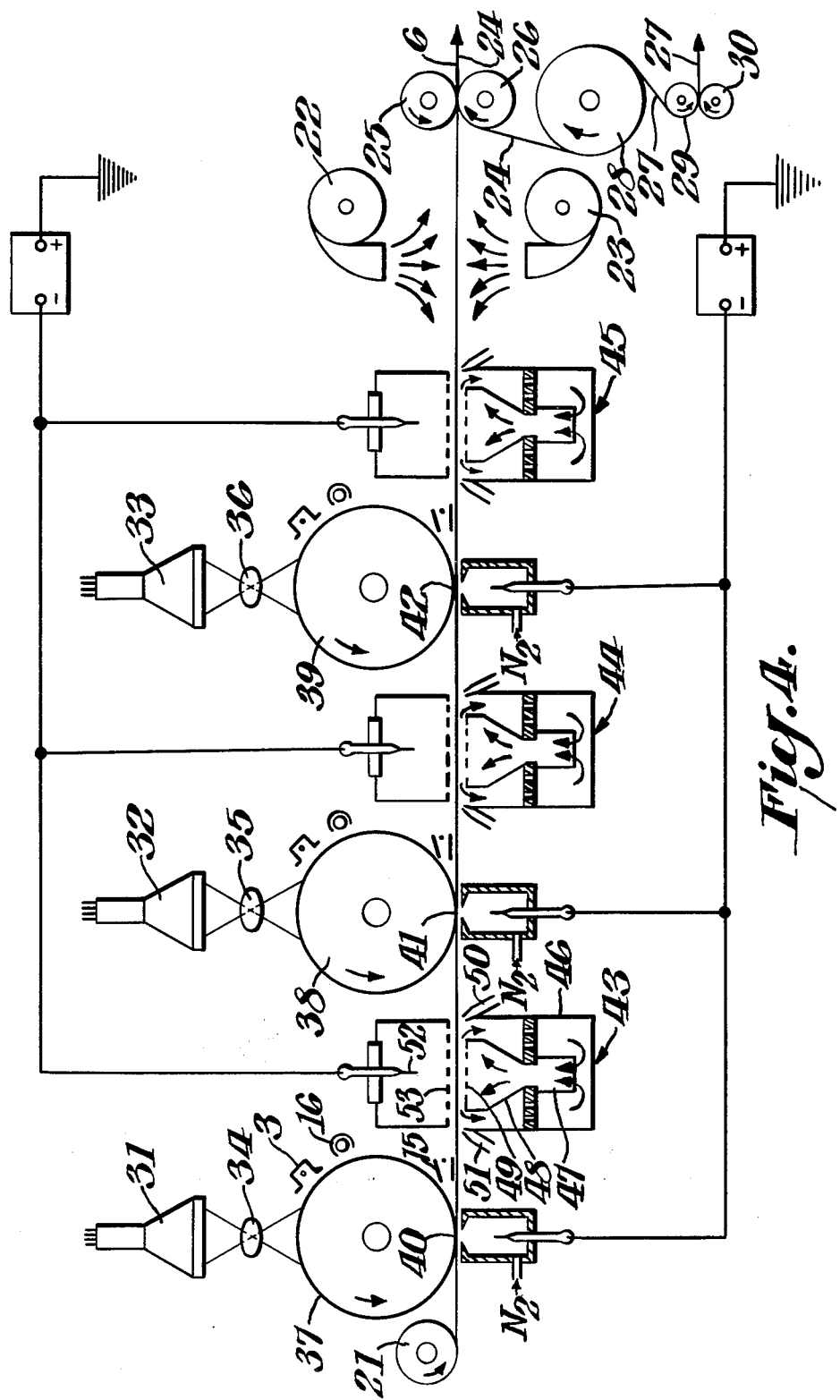

The process will now be described with reference to FIGS. 1 to 4 of the accompanying drawing in which:

FIG. 1 illustrates an apparatus for the transfer printing of a charge image from a cylindrical image carrier to a film which makes contact with the cylinder along a generatrix thereof, FIG. 2 illustrates an ionisation device in operation, FIG. 3 illustrates a simple embodiment of ionisation device of FIG. 2, and FIG. 4 illustrates a multiple transfer printing arrangement with means for developing, drying and fixing the image.

The primary charge image carrier shown in FIG. 1 consists of a selenium layer 1 applied to a metal cylinder 2. In principle, other photoconductive layers could be used instead of the selenium layer, for example layers of selenium arsenide, cadmium sulphide, cadmium selenide or polyvinyl carbazole or photoconductive layers of the kind described by J. W. Dessauer and H. E. Clark in "Xerography and Related Processes", Focal Press London, New York, 1965, Chapters IV, V, VI, pages 89 to 199.

The primary charge image may be produced in known manner, for example by positive charging of the layer by means of a charging device 3 followed by imagewise exposure through a lens system 4. The image may be projected line by line on the projector screen of a tube 5 or it may be represented by some other optical reproduction apparatus, for example commercial projectors or enlargers having an additional device built in for continuous transport of the original image.

To transport the image charge on the cylinder surface, it is necessary to rotate the cylinder in the direction of the arrow, the projected optical image being moved in synchronism with it at the point of exposure or produced by short time exposure. The primary charge image is transferred to another carrier, for example an insulating film 6, along a stripshaped area of contact 7 of insulating film with the selenium layer by transfer of negative charge carriers through the aperture 8 of a metal diaphragm 9 to that surface of the film on which the secondary image is to be produced. The width needed for area of contact depends mainly on the range of action of the charging current and is at least equal to the width of the aperture 8 in the metal diaphragm 9.

If the metal diaphragm 9 and the metal cylinder 2 are both at the same potential, as represented in the drawing, by earthing of both parts, then the insulating film 6 is automatically charged up along the area of contact 7 until the whole area of the image surface has adjusted to a uniform potential close to zero. In that case, the surface charging density is stepped according to the image. The charging current is produced by means of a needle electrode 10 on which a negative corona discharge is produced by a voltage source 11. Discharge takes place in a stream of nitrogen gas which enters the discharge chamber 13 through an inlet 12 and leaves through the aperture 8.

To prevent sudden discharges in the zone 14 where the film separates from the selenium layer, a stream of air having a high ionic content is directed to this zone. The ionic current is produced in the ionisation device 15 described in more detail with reference to FIGS. 2 and 3. As the cylinder 2 continues to rotate, the primary charge image passes through a fully illuminated zone underneath a source of light 16, where the image is erased. Any source of light having an intensity and range of wavelength appropriate to the sensitivity of the photoconductive layer used is suitable for this purpose.

The selenium layer is thus now free to receive a new primary image.

FIG. 2 is a circuit diagram of an ionisation device, showing its mode of operation. Two flat electrodes 17 and 18 are arranged on the two sides of an electric discharge wire 19 with their longitudinal axes parallel to each other and their transverse axes at an angle. A potential difference between the discharge wire and the electrodes is obtained from a voltage source 20 and is high enough to produce a corona discharge. The asymmetry of the arrangement gives rise to discharge currents which cause air to stream in the direction of the arrows. A portion of the ions produced is carried along in the stream of air to areas outside the apparatus. Ionisation of the narrow zone of separation 14 in FIG. 1 is thereby achieved and the production of powerful electric fields prevented. The device is represented in a simple form in FIG. 3.

An overall view of the application of the transfer printing process to multicolour printing is given in FIG. 4 which shows all the various stages of the operation to the finished colour image. According to FIG. 4, a transparent insulating film 6 in the form of a band is unwound from a roll 21 and passed in approximately a straight line through a plurality of transfer printing and development stations. The developed colour image is dried by hot air blowers 22 and 23 and fixed to a white film 24 which is adhesive on one side by pressure applied as the image and the film 24 pass between the rollers 25 and 26. The adhesive film is supplied from a roll 28 in which it is covered by a protective layer 27 which is separated from the film and passed between rollers 29 and 30.

The development stations are used, for example, for successively developing the separation images of a coloured original in the colours yellow, magenta and cyan and printing them in superposition. The usual electrophoretic developers used in electrophotography may be used for this purpose. A description of such developers may be found, for example, in "Xerography and Related Process" by J. H. Dessauer and H. E. Clark, The Focal Press, London and New York, 1965, Section XII, Liquid Development, pages 341 to 370.

The original images are scanned electronically in known manner, the image signals from the various separation colours being fed into respective image tubes 31, 32 and 33 and converted into charge images on selenium drums 37, 38 and 39 by way of copying devices 34, 35 and 36. Direct projection of the partial images on the drums 37, 38 and 39 is, of course, also possible if the appropriate blue, green and red separation filters are used. Transfer printing to the insulating film 6 is carried out at 40, 41 and 42 in the manner described with reference to FIG. 1.

The means used for rendering the secondary images visible may be, for example, fluidised bed devices 43, 44 and 45. Their mode of operation is indicated at 43. The lower part of a container 46 contains a conventional developer liquid. Liquid is continuously pumped into a funnel shaped extension of the inner container 48 by means of an immersion pump 47. The liquid escapes through a metal grid 49 adjacent the insulating film, fills the gap between the grid and the film and flows over the edge of the funnel to return to the lower part of the container 46. Development of the image takes place in the area of insulating film 6 situated opposite the metal grid 49.

To prevent the moving insulating film carrying developer liquid along with it, jet nozzles 50 and 51 are provided at the top edge of the container 46. These nozzles supply a sharp blast of air which forces the liquid back into the development zone and in addition helps to guide the insulating film by pushing it upwards to the contact points against the force of gravity. Such guide devices may, of course, also be used to produce a slightly undulating movement of the film in order to ensure firm contact in the transfer printing area.

The back of the insulating film 6 is kept at a fixed potential by means of an ionic contact of known type. This requires discharge electrodes 52 and grid electrodes 53.

The processes described above with references to the first development area 43 take place in the same way at areas 44 and 45 but with different dyes.

The special features of the embodiments of the invention described above, that is to say restriction of the transfer printing process to a narrow zone along the generatrix of the cylinder and the fact that no contact is made with the image side of the secondary carrier of the insulating film, provide the possibility of electrographic reproduction of half tone colour prints on a simple insulating carrier material.

We claim:
1. Process for transferring charge images for the production of color-prints of colored continuous tone originals wherein a latent image is formed on a photoconductive layer and the latent image is transferred to a charge image on an electrically insulating sheet material said method comprising
 (a) placing a primary charge image on the surface of a photoconductive layer including the steps of
  (i) placing a photoconductive layer in contact with an electrode surface maintained at a given electrical potential and thus charging the photoconductive layer,
  (ii) directing said charged layer to exposure to apparatus providing electromagnetic radiation and positioning the charged layer in said apparatus,
  (iii) imagewise exposing the charged photoconductive layer to an image to provide a positive primary charge image on a surface of the photoconductive layer;
 (b) directing an electrically insulating sheet material in contact with the surface of the photoconductive layer carrying the primary charge image, said contact being along an elongated narrow area of contact between the charged photoconductive layer and a first surface of the sheet material
 (c) supplying a gas having a high concentration of nitrogen having less than 1% of air with nitrogen in a stream flow directed on a second and opposite side of the sheet material and into the vicinity of the elongated narrow area of contact and producing a current consisting of high-speed electrons for providing a negative charge on said opposite side by means of a voltage source at a needle electrode located in the stream of concentrated nitrogen producing a corona discharge within the stream of concentrated nitrogen, so as to
 (d) uniformly charge the insulating sheet material by the charge carrying current of high speed electrons on the opposite side at the narrow strip of contact between the first surface and the photoconductive layer,
 (e) and transfer printing the primary charge image to a secondary charge image in the surface of the insulating sheet material in contact with the photoconductive layer, said secondary charge image produced in a charging area along said area of contact by high-speed electrons from the corona discharge, and including the step of
 (f) separating the sheet material from the photoconductive layer.

2. A process according to claim 1 wherein the electrode surface for the photoconductive layer is a rotatable conductive cylinder and the insulating sheet material is guided over the contact area at a circumferential velocity in relation to the cylinder rotation to minimize slippage between the contacting surfaces.

3. A process as claimed in claim 2, characterised in that the charge current for charging the insulating film is concentrated on a narrow area of contact between the insulating sheet material and the cylinder by means of a slotted diaphragm between the corona discharge device and the charging area.

4. A process as claimed in claim 3, characterised in that Lichtenberg figures in the transferred image caused by discharges at the separation of the sheet material from the photoconductive layer are prevented by the direction of a stream of air carrying ions to the zone of separation between the insulating sheet material and the cylinder.

5. A process according to claim 4, characterised in that the ionised stream of air is produced in a device in which a discharge electrode in the form of a wire is arranged in front of a gas permeable counter electrode and a one sided discharge producing the ionised stream of air is generated as a result of an asymmetry in the arrangement under voltage.

6. A process according to claim 5, characterised in that a plurality of transfer printing stations are arranged one behind the other so that partial images from a plurality of carriers of primary charge images are transferred to a common secondary image carrier.

7. A process according to claim 6, characterised in that colour separations of a coloured original image are printed in superimposed registration in an arrangement of a plurality transfer printing stations and developed in the appropriate primary colours in intermediate stations.

8. A process according to claim 1, characterised in that the secondary image carrier comprises an insulating band, the guidance of the band being assisted by jets of air from nozzles.

* * * * *